Figure 1:
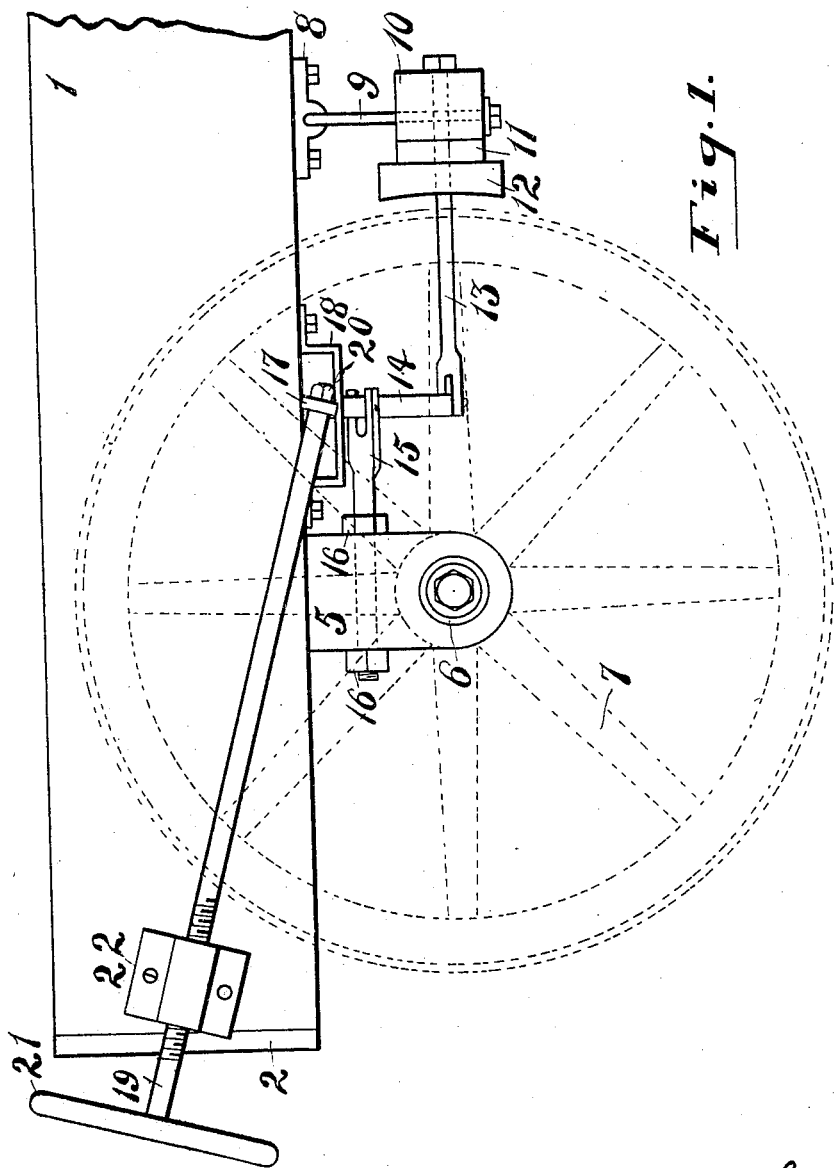

No. 799,797. PATENTED SEPT. 19, 1905.
J. W. MILLER.
BRAKE MECHANISM.
APPLICATION FILED JAN. 23, 1905.

2 SHEETS—SHEET 1.

Witnesses:
A. E. Kling
Glenard Fox

Inventor,
J. W. Miller,
by C. E. Humphrey,
Atty.

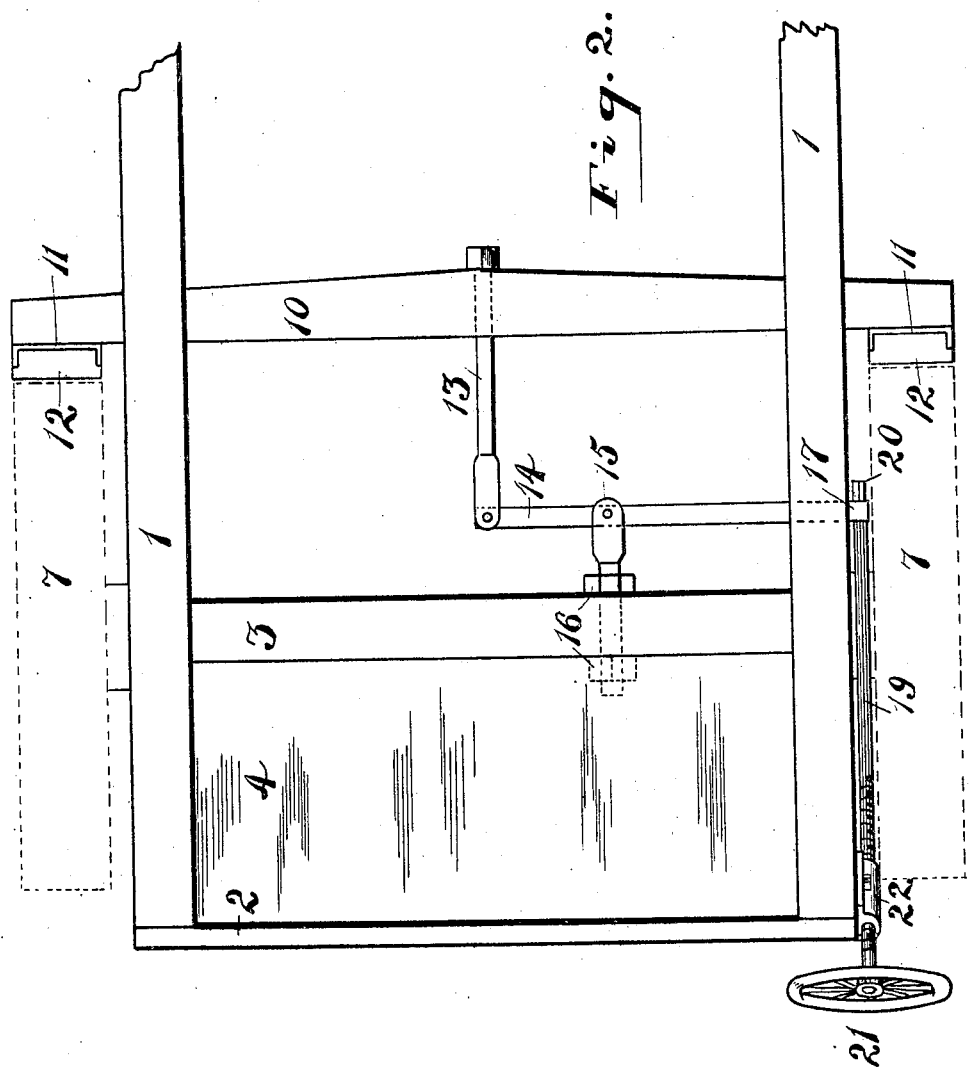

UNITED STATES PATENT OFFICE.

JOHN W. MILLER, OF AKRON, OHIO.

BRAKE MECHANISM.

No. 799,797.      Specification of Letters Patent.      Patented Sept. 19, 1905.

Application filed January 23, 1905. Serial No. 242,347.

*To all whom it may concern:*

Be it known that I, JOHN W. MILLER, a citizen of the United States, residing at Akron, in the county of Summit and State of Ohio, have invented new and useful Improvements in Brake Mechanism, of which the following is a specification.

My invention has relation to improved brake mechanism for vehicles, and is especially adapted for use on extremely-heavy vehicles, such as portable well-drilling outfits, wherein the weight upon the wheels is excessive and the necessity for extreme security in the application of the brake is essential.

The object of my invention is to provide improved brake-operating mechanism whereby the brakes may be set and retained securely against accidental release and yet may be released with perfect ease by the operator.

Heretofore in the construction of heavy vehicles, especially portable well-drilling outfits, the absolute and perfect control of the brake-operating mechanism has been attended with only a fair degree of success, and hence it is my object to remedy this defect by placing at the disposition of the operator of the vehicle such mechanism as will enable him at all times to set the brake with such security as to render the vehicle entirely within his control.

In accomplishing the before-mentioned object my invention consists in certain new and peculiar mechanism, a preferred form of which is hereinafter described, and shown in the drawings.

In the drawings, in which similar reference-numerals indicate like parts in the different figures, Figure 1 is a side elevation of the rear end of a portable well-drilling outfit, showing the rear end of the frame, with the wheels in dotted lines; and Fig. 2 is a plan view of the construction shown in Fig. 1.

In the drawings, 1 1 represent the two main sides of the vehicle, and as these are long and very heavy the weight upon the vehicle-wheels is excessive. These two frame-timbers 1 1 are united at the rear of the vehicle by a cross-board 2, and these timbers are further united by additional cross-pieces 3 at suitable intervals sufficient to give stability to the device.

A floor 4 may, if desired, close the bottom of the opening bounded by the side timbers 1 1, the cross-board 2, and the cross-piece 3. However, this is not essential to the device, but is here shown as illustrating the common construction of this framework. Below the side timbers 1 1 and extending transversely to the longitudinal line of the vehicle is an axle-supporting timber 5, from which project the axles 6 for the vehicle-wheels 7.

The wheels 7 in the drawings are shown in dotted lines, so as not to obstruct a clear view of the mechanism for operating the brake, and as their position and functions are the same as any other vehicle-wheels it is believed that better results in the understanding of this device will be obtained by thus representing them.

In transverse alinement with each other on the under faces of the timbers 1 are placed a pair of transversely-perforated link-holding members 8, from which are pivotally hinged links 9, the lower ends of which are attached to a brake-beam 10 of any suitable or preferred construction which the maker of the vehicle deems best for the purpose to which it is to be applied. On the outer ends of this brake-beam 10 are two shoe-retaining members 11, in which are brake-shoes 12 so placed that when the beam is swung in one direction the shoes 12 will encounter the outer faces of the rims of the wheels, and thereby create frictional resistance to the revolution thereof. The mechanism by which the brake-beam 10 is caused to swing backward and forward toward and away from the peripheries of the wheels consists of a rod 13, passing approximately centrally through the body of the brake-beam and having at its outer end a bifurcated head into which is pivoted one end of a lever 14. Fulcrumed in the bifurcated head of a bolt 15, the body portion of which passes through the axle-supporting timber 5 and is held from movement therein by nuts 16, which clamp the sides of this timber, is a lever 14. The end of the lever 14 which is not attached to the rod 13 passes under one of the beams 1 and terminates in an eye 17 and is steadied and guided in its oscillating motion by a guide 18, fastened to the under side of one of the timbers 1. The movements of the end of this lever 14 are controlled by means of an inclined shaft 19, one end of which is reduced and passes through the perforation in the eye 17 and is held there by a nut 20, the opposite end of the shaft 19 being provided with a hand-wheel 21, and the medial portion is threaded and passes through a nut 22, fastened to the outside of one of the timber-frames 1, so that the revolution of the hand-wheel 21 will cause a forward or backward motion of the outer end of the lever 14 and a corresponding movement of the lever end, thereby operating the brake-beam and causing frictional engagement of the brake-shoes with the rims of the wheels.

What I claim, and desire to secure by Letters Patent, is—

A brake mechanism for vehicles, comprising the combination with the vehicle having depending from the lower portion of its body, a transversely-extending bar, of a brake-beam arranged below the body of the vehicle and provided at each end with a brake-shoe adapted to engage the wheels of the vehicle, a forwardly-projecting rod having a bifurcated forward end and its rear end extending through the beam in a longitudinal manner at the center thereof, said rod at its rear end having an abutment arranged exteriorly of and engaging the rear face of the beam, an inclined lever extending transversely with respect to the body of the vehicle and having its inner end pivotally connected with the bifurcated end of said rod, the outer end of said lever formed with an eye, a rearwardly-extending bolt carried by said bar and having a bifurcated end adapted to receive said lever, means extending through the bifurcated end of said bolt for pivotally connecting the lever therewith, and means extending through the eye of the lever and adapted when operated to actuate the lever and bar, thereby shifting the brake-beam.

In testimony whereof I have hereunto set my hand in presence of two subscribing witnesses.

JOHN W. MILLER.

Witnesses:
H. A. HEINY,
D. B. DUFF.